July 3, 1951   F. E. MILNER   2,558,907
AUTOMATIC LOCKING COUPLING PIN
Filed June 6, 1949
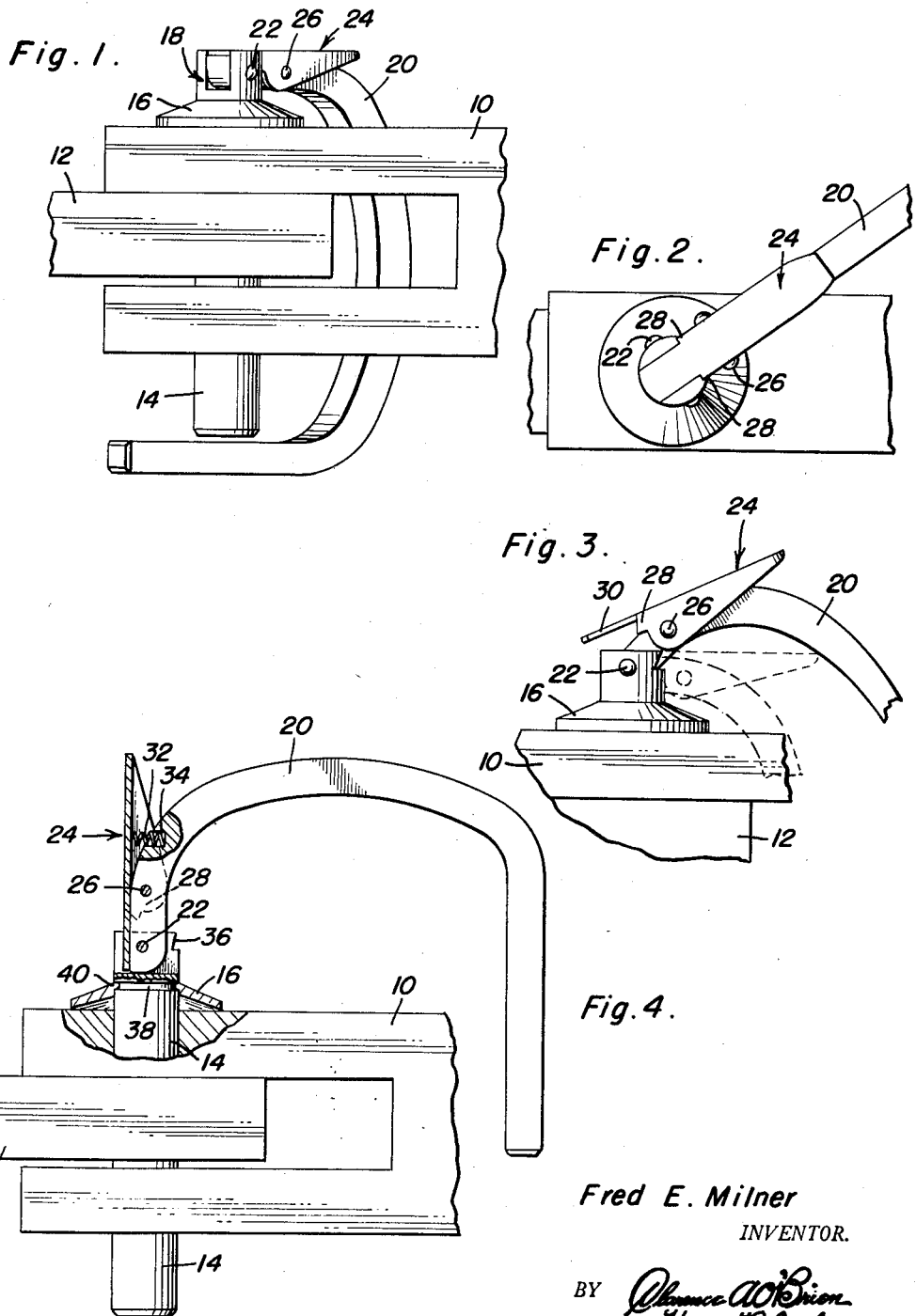
Fred E. Milner
INVENTOR.

Patented July 3, 1951

2,558,907

UNITED STATES PATENT OFFICE 2,558,907

AUTOMATIC LOCKING COUPLING PIN

Fred E. Milner, Ossian, Ind.

Application June 6, 1949, Serial No. 97,345

3 Claims. (Cl. 85—8.3)

This invention relates to new and useful improvements in automatic locking couplings and more particularly to an improvement over a prior patent to Fuhrer et al. No. 2,436,210, dated February 17, 1948.

The primary object is to provide a coupling pin that is easy to operate, especially in removing the same.

Another important object is to provide a coupling pin that combines ease of operation with a rugged and reliable locking action, requiring only one hand and one motion to unlock and remove the pin.

The above and further ancillary objects and advantages of the invention, as will hereinafter more fully appear, is attained by the construction described in the specification and illustrated in the drawings.

Reference is had to the accompanying drawings, in which:

Figure 1 is a side elevational view of the improved coupling pin locked in position relative to a yoke and coupling bar;

Figure 2 is a top view of the coupling pin as shown in Figure 1;

Figure 3 is a side view showing the operation of the latch and locking device, the solid lines showing the coupling unlocked, while the dotted lines show the position of the parts when the coupling is locked;

Figure 4 is a side elevation of the coupling pin in the unlocked position with parts broken away to show the structure of the ring and the position of the spring.

Referring now to the drawings in detail, wherein for the purpose of illustration is disclosed a preferred embodiment of the present invention, the numeral 10 represents a yoke and the numeral 12 indicates a coupling bar intended for reception in and coupling to the yoke.

The coupling pin itself comprises a shank 14 which is inserted through openings provided in the yoke 10 and the coupling bar 12. It is seen in Figure 1 that the insertion of shank 14 is limited by a ring 16 which rides upon the upper surface of the yoke 10. The ring 16 being firmly fixed to the shank 14. One end of the shank 14 is bifurcated as indicated by the numeral 18 to receive one end of a U-shaped frame 20. The frame 20 being secured to the shank 14 by means of a pivot 22.

A latch 24 is pivotally secured to the frame 20 by means of a pivot 26.

As is seen in Figure 1, the latch 24 is essentially a channel member. The legs or sides of the latch 24 embrace the frame 20 and it is through this leg portion that the pivot 26 passes. The legs are also shaped so as to have dogs 28 formed thereon. The web of the latch 24 has an extension 30 forming an upper bearing surface. Centrally located and fastened to the underside of the latch 24 is a spring 32 which extends into a retaining recess 34 provided in the frame 20.

The recesses 36 are provided in the upper end of the shank 14 for engaging and receiving the locking dogs 28 when the coupling pin is in the locked position.

A groove 38 is provided in the upper end of the shank 14 to receive a rib 40 which extends around the inner circumference of the ring 16, thus retaining the ring 16 upon the shank 14.

The U-shaped member 20 is so shaped that when the pin is in the locked position, as is shown in Figure 1, it is impossible to remove the coupling pin from the yoke 10 and the coupling bar 12. It is seen in Figure 4, in which the coupling pin is shown in the open or unlocked position, that the frame 20 is now in a position permitting removal of the coupling pin from the yoke 10 and the coupling bar 12.

It is believed from the illustrations and the preceding description that the operation of this device will be readily understood. To use the device the individual picks up the open coupling pin, leaving one hand free to align the coupling bar and the yoke, and inserts the shank 14 through the aligned openings of the yoke 10 and the coupling bar 12 until the ring 16 rests upon the upper surface of the yoke 10, whereupon the operator simply releases the frame member 20, the frame member 20 then swinging by its own weight to the locking position, the spring member 32 forcing the locking dogs 28 into the recess 36 thus locking the coupling pin.

It is to be noted the ease with which the coupling is unlocked and removed from the yoke 10 and coupling bar 12. The operator simply grasps the frame 20 with his thumb resting upon the latch 24. The operator depresses the latch 24 with his thumb, which removes the locking dogs 28 from the recesses 36, and swings the frame 20 to the unlocked position and withdraws the pin from the coupling bar and the yoke. During the entire period of unlocking and removing the coupling pin, the operator has had his other hand free to jiggle the connection between the yoke 10 and the coupling bar 12 to facilitate the removal of the coupling pin.

Numerous advantages flow from the type of latch used in this invention and its position relative to the other parts of the coupling pin. The latch and lock are easily seen without the operator having to stoop over. It permits one arm operation of the coupling pin. It is distinctly advantageous to have the latch and locking means carried on top of the yoke 10 and the coupling bar 12 in that they are not nearly as liable to be struck by flying rocks or the like and thus create a dangerous condition.

It being understood that the embodiment shown and described is for illustrative purposes only, and it is not intended to thus limit and restrict the spirit of this invention, but rather to the scope of the appended claims.

Having described the invention, what is claimed as new is:

1. A locking coupling pin construction comprising a straight shank bifurcated at its upper end, a U-shaped frame having one end pivoted to and received between the furcations of the shank, a U-shaped latch member including flanges connected by a web portion, said latch member straddling the frame and pivoted thereto adjacent said one end, the upper portion of one of the furcations of the shank having a locking surface, a locking dog on one of the flanges of the latch member adapted to lockingly engage the locking surface of the shank when said one end of the frame is at right angles to the shank, and spring means connecting the latch member and the U-shaped frame and yieldingly urging the locking dog into a position to engage the locking surface.

2. A locking coupling pin construction comprising a straight shank bifurcated at its upper end, a U-shaped frame including first and second legs connected by a web, the free end of said first leg pivoted to and received between the furcations of the shank, a U-shaped latch member including flanges connected by a web portion, said latch member straddling the first leg and pivoted to the frame adjacent the juncture of the first leg with the web of the frame, the upper portion of one of the furcations of the shank having a locking surface, a locking dog on one of the flanges of the latch member adapted to lockingly engage the locking surface of the shank when the first leg is at right angles to the shank, the web portion of the latch member including a part extending away from the free end of the first leg and beyond the juncture of the first leg with the web of the frame, the web of the frame having a recess therein, and a compression spring seated in the recess and biased against the extending part of the latch member.

3. The combination of claim 1 including a stop ring, said shank having an annular groove therein closely spaced below the bifurcated upper end thereof, said ring surrounding the shank and partially received in the groove to prevent longitudinal movement of the same on the shank.

FRED E. MILNER.

REFERENCES CITED

The following references are of record in the file of this patent:

UNITED STATES PATENTS

| Number | Name | Date |
|---|---|---|
| 286,920 | Funk | Oct. 16, 1883 |
| 2,367,874 | Kelley | Jan. 23, 1945 |

FOREIGN PATENTS

| Number | Country | Date |
|---|---|---|
| 532,113 | Germany | Aug. 25, 1931 |